United States Patent
Hu et al.

(10) Patent No.: US 12,489,573 B2
(45) Date of Patent: Dec. 2, 2025

(54) SIGNAL PROCESSING METHOD, INFORMATION CONFIGURATION METHOD, DEVICE, AND STORAGE MEDIUM

(71) Applicant: ZTE CORPORATION, Shenzhen (CN)

(72) Inventors: Linxi Hu, Shenzhen (CN); Nan Zhang, Shenzhen (CN); Wei Cao, Shenzhen (CN); Zhen Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 442 days.

(21) Appl. No.: 18/016,253

(22) PCT Filed: Jul. 7, 2021

(86) PCT No.: PCT/CN2021/104946
§ 371 (c)(1),
(2) Date: Jan. 13, 2023

(87) PCT Pub. No.: WO2022/012387
PCT Pub. Date: Jan. 20, 2022

(65) Prior Publication Data
US 2023/0291522 A1    Sep. 14, 2023

(30) Foreign Application Priority Data
Jul. 17, 2020    (CN) .......................... 202010693884.9

(51) Int. Cl.
*H04L 5/00*    (2006.01)

(52) U.S. Cl.
CPC .................. *H04L 5/0048* (2013.01)

(58) Field of Classification Search
CPC ... H04L 5/0048; H04L 5/0016; H04L 5/0023; H04L 5/0062; H04B 7/1853;
(Continued)

(56) References Cited

U.S. PATENT DOCUMENTS

| | | | |
|---|---|---|---|
| 2016/0197659 A1* | 7/2016 | Yu | H04B 7/0617 370/335 |
| 2018/0205469 A1 | 7/2018 | Nagaraja et al. | |

(Continued)

FOREIGN PATENT DOCUMENTS

| | | |
|---|---|---|
| CN | 106888042 A | 6/2017 |
| CN | 108112080 A | 6/2018 |

(Continued)

OTHER PUBLICATIONS

Chinese First Office Action dated Apr. 29, 2024 in corresponding Chinese Application No. 202010693884.9, translated, 17 pages.

(Continued)

*Primary Examiner* — Dady Chery
(74) *Attorney, Agent, or Firm* — MH2 TECHNOLOGY LAW GROUP LLP

(57) ABSTRACT

A signal processing method and apparatus, an information configuration method and apparatus, a device, and a storage medium are provided. The signal processing method includes: receiving reference signal configuration information, the reference signal configuration information including a reference signal generation mode; and processing a signal on the basis of the reference signal configuration information.

20 Claims, 5 Drawing Sheets

Receive reference signal configuration information, the reference signal configuration information including a reference signal generation mode — S11

Process a signal based on the reference signal configuration information — S12

(58) Field of Classification Search
CPC ...... H04B 7/0617; H04B 1/62; H04B 7/0408; H04W 72/04; H04W 72/23; H04W 84/06; H04W 16/28; H04J 3/1694; H04J 13/0003

See application file for complete search history.

(56) References Cited

U.S. PATENT DOCUMENTS

| | | |
|---|---|---|
| 2019/0394666 A1 | 12/2019 | Li et al. |
| 2020/0336256 A1 | 10/2020 | Chen et al. |
| 2021/0143957 A1 | 5/2021 | Gao et al. |
| 2022/0400040 A1 | 12/2022 | Wang |

FOREIGN PATENT DOCUMENTS

| | | |
|---|---|---|
| CN | 109120388 A | 1/2019 |
| CN | 111294188 A | 6/2020 |
| CN | 111901090 A | 11/2020 |
| KR | 1020160075996 A | 6/2016 |
| KR | 1020160143509 A | 12/2016 |
| WO | 2019096237 A1 | 5/2019 |
| WO | 2020015660 A1 | 1/2020 |

OTHER PUBLICATIONS

"R1-1717822," 3GPP TSG RAN WG1 Meeting 90bis, Prague, CZ, Oct. 3, 2017, 9 pages.

"R1-1609079," 3GPP TSG RAN WG1 #86-bis, Lisbon, PT, Sep. 30, 2016, 4 pages.

European Extended Search Report mailed Jul. 30, 2024 in corresponding European Application No. 21841992.7, 8 pages.

International Search Report and Written Opinion dated Sep. 28, 2021 in corresponding International Application No. PCT/CN2021/104946, translated, 14 pages.

* cited by examiner $v_{shift} = 0$     $v_{shift} = 1$     $v_{shift} = 2$ $v_{shift} = 0$     $v_{shift} = 1$     $v_{shift} = 2$

SIGNAL PROCESSING METHOD, INFORMATION CONFIGURATION METHOD, DEVICE, AND STORAGE MEDIUM

CROSS-REFERENCE TO RELATED APPLICATIONS

This application is a national phase entry under 35 USC 371 of International Patent Application No. PCT/CN2021/104946 filed on Jul. 7, 2021, which claims priority to Chinese Patent Application No. 202010693884.9 filed before the Chinese Patent Office on Jul. 17, 2020, which are incorporated herein by reference in their entirety.

TECHNICAL FIELD

The present disclosure relates to the field of communication technologies, and in particular, to a signal processing method, an information configuration method, a device, and a storage medium.

BACKGROUND

In a non-terrestrial network (NTN), a base station includes a plurality of service beams, and a coverage area of each beam corresponds to a service area on the ground. For an aerial base station moving at a high speed, coverage areas of a plurality of beams form a physical cell, which corresponds to a same physical cell ID (PCI), and only an intra-cell handover is performed when service beams in the same physical cell need to be changed for users.

For signals in different beams in the same physical cell, if they use the same wireless time-frequency resources, there may be a problem of interference.

SUMMARY

In a first aspect, embodiments of the present disclosure provide a signal processing method. The method is applied to a first node, and includes:
  receiving reference signal configuration information, the reference signal configuration information including a reference signal generation mode; and
  processing a signal based on the reference signal configuration information.

In a second aspect, embodiments of the present disclosure provide an information configuration method. The method is applied to a second node, and includes:
  determining reference signal configuration information, the reference signal configuration information including a reference signal generation mode; and
  transmitting the reference signal configuration information.

In a third aspect, embodiments of the present disclosure provide a signal processing apparatus. The apparatus is configured at a first node, and includes a receiving module and a processing module.

The receiving module is configured to receive reference signal configuration information, and the reference signal configuration information includes a reference signal generation mode.

The processing module is configured to process a signal based on the reference signal configuration information.

In a fourth aspect, embodiments of the present disclosure provide an information configuration apparatus. The apparatus is configured at a second node, and includes a determination module and a transmission module.

The determination module is configured to determine reference signal configuration information, and the reference signal configuration information includes a reference signal generation mode.

The transmission module is configured to transmit the reference signal configuration information.

In a fifth aspect, embodiments of the present disclosure provide a device. The device includes:
  one or more processors; and
  a memory configured to store one or more programs.

The one or more programs, when executed by the one or more processors, cause the one or more processors to implement the method as described in any of the embodiments of the present disclosure.

In a sixth aspect, embodiments of the present disclosure provide a storage medium. The storage medium has stored thereon a computer program, and the computer program, when executed by a processor, implements the method as described in any of the embodiments of the present disclosure.

The above embodiments, other aspects and implementation methods of the present disclosure will be described in more detail in the brief description of the drawings, the detailed description and the claims.

DETAILED DESCRIPTION

Figure 1:
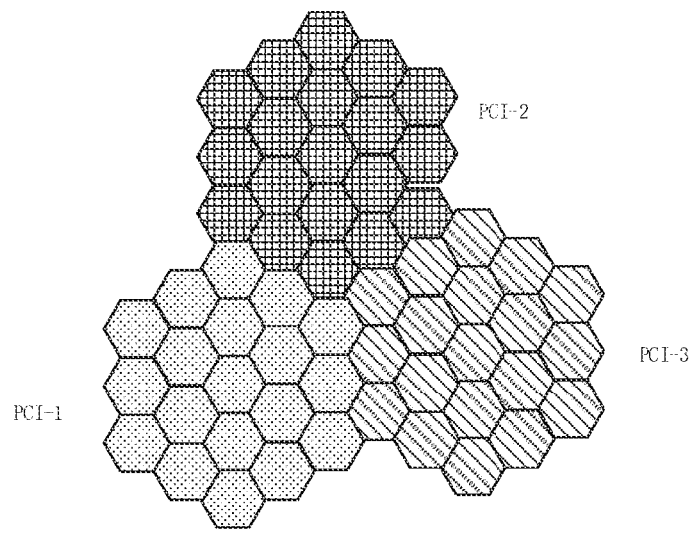
FIG. 1 is a schematic diagram showing a distribution of physical cells and beams in a NTN provided by embodiments of the present disclosure.

Embodiments of the present disclosure will be described in detail below with reference to the accompanying drawings.

The steps shown in the flow charts of the accompanying drawings may be executed in a computer system such as a set of computer-executable instructions. In addition, although the logical order is shown in the flow chart, in some cases, the steps shown or described may be performed in an order different from the order given herein.

Technical solutions of the present disclosure may be applied to various communication systems, for example, the global system of mobile communication (GSM), the code division multiple access (COMA) system, the wideband code division multiple access (WCOMA) system, the general packet radio service (GPRS), the long term evolution (LTE) system, the advanced long term evolution (LTE-A) system, the universal mobile telecommunication system (UMTS), the fifth generation (5G) mobile communication technology system, the beyond fifth generation (B5G) mobile communication system, and the sixth generation (6G) mobile communication technology system, which is not limited in the embodiments of the present disclosure. In the present disclosure, the 5G system is taken as an example for illustration.

The embodiments of the present disclosure may be applied to wireless networks of different standards. Wireless access networks may include different communication nodes in different systems; and the communication nodes include at least a base station and a user terminal.

First, in the embodiments of the present disclosure, the base station may be a device capable of communicating with the user terminal. The base station may be any kind of device with a wireless transceiving function. The base station includes, but is not limited to: a base station NodeB, an evolved base station eNodeB, a base station in a 5G communication system, a base station in a future communication system, and an access node, a wireless relay node or a wireless backhaul node in a WiFi system. The base station may also be a wireless controller in a cloud radio access network (GRAN) scenario. The base station may also be a small station, a transmission reference point (TRP), etc., which is not limited in the embodiments of the present disclosure.

In the embodiments of the present disclosure, the user terminal is a device with a wireless transceiving function. The user terminal may be deployed on land, which includes indoor or outdoor, handheld, wearable or vehicle-mounted; the user terminal may also be deployed on water (e.g., on a ship); the user terminal may also be deployed in the air (e.g., on an airplane, on a balloon, on a satellite). The user terminal may be a mobile phone, a tablet computer (pad), a computer with a wireless transceiving function, a virtual reality (VR) terminal, an augmented reality (AR) terminal, a wireless terminal in an industrial control system, a wireless terminal in a self driving system; a wireless terminal in a remote medical system, a wireless terminal in a smart grid, a wireless terminal in a transportation safety system, a wireless terminal in smart city, a wireless terminal in smart home, etc. The embodiments of the present disclosure do not limit the application scenarios. The user terminal may also be referred to as a terminal, an access terminal, a user equipment (UE) unit, a UE station, a mobile station, a mobile radio station, a remote station, a remote terminal, a mobile device, a UE terminal, a wireless communication device, a UE agent, a UE device, etc., which is not limited in the embodiments of the present disclosure.

In the NTN, a base station includes a plurality of service beams, and a coverage area of each beam corresponds to a service area on the ground. For an air base station moving at a high speed, when the coverage area of the beam moves along with the satellite, the users on the ground also need to switch between different service beams in time. In this case, if the coverage area of each beam corresponds to a single PCI, an inter-cell handover of a large number of users may be performed frequently, resulting in a large amount of signaling overhead. Therefore, it is arranged that the coverage areas of a plurality of beams form a physical cell corresponding to the same PCI, so that only an intra-cell handover is performed when service beams in the same physical cell need to be changed for users. As shown in FIG. 1, the coverage areas of a plurality of beams form PCI-1, the coverage areas of a plurality of beams form PCI-2, and the coverage areas of a plurality of beams form PCI-3.

However, for signals in different beams in the same physical cell, if they use the same wireless time-frequency resources, there may be a problem of interference. At present, in the ground network configuration of narrow-band Internet of things (NB-IoT) and enhanced machine type communication (eMTC), only PCI can be used to distinguish physical cells and reduce inter-cell interference, and there is no relevant operation for dealing with interference between beams. Therefore, for NB-IoT and eMTC in the NTN, interference between beams needs to be suppressed.

In wireless communication, a reference signal is usually used to accurately measure and estimate a wireless channel, so as to ensure the transmission performance on other physical channels. To improve the accuracy of measurement and estimation with the reference signal, the interference subjected by the reference signal needs to be reduced as much as possible. At present, the reference signal configuration in NB-IoT and eMTC can only deal with interference between cells, users and ports, and there is no way to deal with interference between beams. In the NTN, a frequency reuse factor (FRF) is used to characterize the number of non-overlapping frequency bands the entire system bandwidth is divided into, and each beam can be assigned a certain frequency band. For example, when the reuse factor is 1, it means that all beams use the same frequency band. When the reuse factor is greater than 1, it means that adjacent beams may use different frequency bands, but non-adjacent beams may still use the same frequency band. For beams using the same frequency band, there will be resource overlap between reference signals, resulting in a problem of interference. In a case where the FRF is equal to 1, interference mainly comes from adjacent beams; while in a case where the FRF is greater than 1, interference mainly comes from non-adjacent beams using the same frequency band. If there is no way to suppress the interference to the reference signal between beams using the same frequency band, the performance of the system may be affected due to excessive interference.

With a demodulation reference signal (DMRS) as an example, the DMRS is used to estimate channels of corresponding data. According to the current protocol, assuming that there are two beams, namely, beam 1 and beam 2, if the same physical resources are assigned to corresponding data channels, as long as the PCIs are the same, the corresponding DMRS sequences and the time-frequency positions corresponding to the DMRS are also the same. For beam 1, an equivalent channel estimated by the DMRS thereof is $h\_1+h\_2$, where and $h\_2$ are channels actually experienced by beam 1 and beam 2 to reach the same receiving end, respectively. However, for the data, the data sequences transmitted by the two beams are not exactly the same, so the equivalent channel experienced by the data of beam 1 is $h\_1$, which greatly reduces the accuracy of using the DMRS to estimate data channels.

In order to solve the above problems, the embodiments of the present disclosure provide the following technical solutions.

Figure 2:
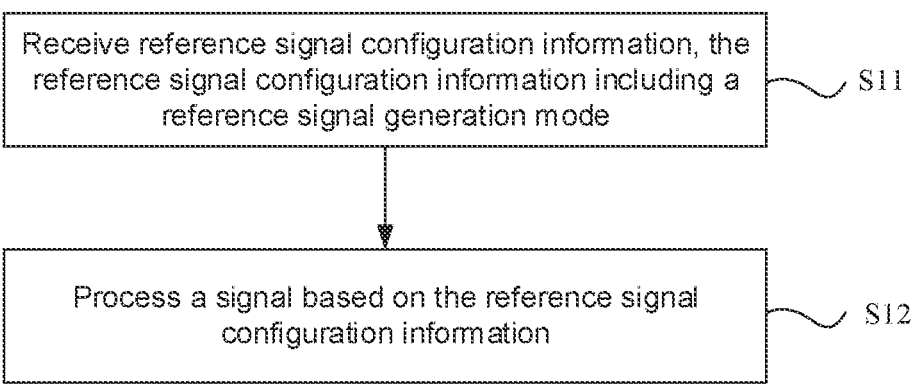
FIG. 2 is a flow chart of a signal processing method provided by embodiments of the present disclosure.

In an embodiment, as shown in FIG. 2, a signal processing method provided by the embodiments of the present disclosure mainly includes steps S11 and S12.

In S11, reference signal configuration information is received, the reference signal configuration information including a reference signal generation mode.

In S12, a signal is processed based on the reference signal configuration information.

The signal processing method is performed by a first node, and the first node may be any of the above user terminals.

Receiving reference signal configuration information may be receiving reference signal configuration information transmitted by a second node, and the second node may be any of the above base stations. The reference signal configuration information is configured and transmitted by the second node.

The reference signal generation mode refers to processing an existing reference signal, so that interference between different beams in the same physical cell may be suppressed.

In an exemplary embodiment, the reference signal configuration information is received by one or more of:
 a broadcast message, a radio resource control (RRC) signaling, or a media access control control element (MAC CE) signaling.

In an exemplary embodiment, the reference signal generation mode is associated with a beam-related serial number.

In an exemplary embodiment, reference signals are in one-to-one correspondence with beams.

The beam may be represented by one or more of: a reference signal identification (ID), a quasi co-location relationship, a polarization pattern, a frequency domain resource ID, a time domain resource ID, a spatial domain resource (including an antenna port, a codebook, a transmission layer, etc.) ID, a geographical area ID, a cell ID, and a tracking area ID.

In an exemplary embodiment, the description that the reference signal generation mode is associated with the beam-related serial number includes one or more of the following situations:
 a resource occupied by a reference signal in a frequency domain is associated with the beam-related serial number;
 a resource occupied by the reference signal in a time domain is associated with the beam-related serial number; or
 a sequence code of the reference signal is associated with the beam-related serial number.

The reference signal generation modes mentioned above may be used independently or in combination, and a corresponding relationship between any combination and the beam-related serial number has been defined in advance. The users may be informed of the corresponding relationship between the combination of the reference signal generation modes and the beam-related serial number through a broadcast message, a MAC CE or a RRC signaling. In some embodiments, the aforementioned broadcast message is referred to a broadcast signaling as well.

The description that the resource occupied by the reference signal in the frequency domain is associated with the beam-related serial number may mean that beams are assigned with different frequency bands, that is, different beams are assigned with different resource block (RB) resources. It may also mean that when beams are assigned with the same RB resource, the reference signals (RSs) of different beams occupy different subcarriers, different resource elements (REs), or different resource units (RUs) in the frequency domain.

The description that the resource occupied by the reference signal in the time domain is associated with the beam-related serial number may mean that when the beams occupy the same frequency domain resource, the reference signals of different beams occupy different orthogonal frequency division multiplexing (OFDM) symbols in the time domain.

The description that the sequence code of the reference signal is associated with the beam-related serial number may mean that different random seeds can be used for reference signals of different beams to generate different random sequences (i.e., a reference signal generation sequence). A value of the random seed is related to the beam-related serial number. In some embodiments, the sequence code of the reference signal is referred to a random sequence code of the reference signal as well, and the beam-related serial number is referred to a beam serial number as well.

The description that the sequence code of the reference signal is associated with the beam-related serial number may also mean that a random scrambling code sequence is used to perform beam-level scrambling on the RS generation sequence of different beams, so as to obtain a reference signal scrambling sequence. A random seed of the random scrambling code sequence is associated with the beam-related serial number. In some embodiments, the sequence code of the reference signal is referred to a random sequence code of the reference signal as well, and the beam-related serial number is referred to a beam serial number as well, and the random scrambling code sequence is referred to a random scrambling code.

In an exemplary embodiment, the resource occupied by the reference signal in the frequency domain includes one or more of:
 a resource block (RB), a carrier, a subcarrier, a resource element (RE), or a resource unit (RU).

In an exemplary embodiment, a method for associating the resource occupied in the frequency domain with the beam-related serial number includes one or more of: determining a position of the resource by the beam-related serial number and a frequency domain interval; or corresponding the number of resources to the beam-related serial number in a specific way.

In an exemplary embodiment, the resource occupied by the reference signal in the time domain includes: an OFDM symbol.

In an exemplary embodiment, a method for associating the resource occupied in the time domain with the beam-related serial number includes one or more of:
 determining a position of the resource by the beam-related serial number and a time domain interval; or
 corresponding the number of resources to the beam-related serial number in a specific way.

In an exemplary embodiment, the sequence code of the reference signal includes one or more of:
 a reference signal generation sequence, or a scrambling sequence of the reference signal.

In an exemplary embodiment, the beam-related serial number includes one or more of:
 a beam ID, a beam group ID, an ID within a beam group, or a resource ID of a resource occupied by a beam.

A resource corresponding to the resource ID of the resource occupied by the beam is other resources except for time-frequency resources, and should be numbered on the basis of consistency of time-frequency resources. That is, different resource IDs should be discussed in a case of consistent time-frequency resources. The resource ID may be an antenna port ID, etc.

In an exemplary embodiment, in a case where beams are not grouped, the beam-related serial number is the beam ID.

If the base station does not group the beams and directly numbers them, the iv beam beam-related serial number may be a beam ID, which is expressed as and the base station directly indicates the beam ID through a broadcast message. In some embodiments, the aforementioned broadcast message is referred to a broadcast signal as well.

In an exemplary embodiment, in a case where beams are grouped, and beams in the same group use time-frequency resources that do not overlap with each other, the beam-related serial number is the beam group ID.

If the base station groups the beams, and the beams within a group use time-frequency resources that do not overlap with each other, the beam-related serial number is a beam group ID, which is expressed as $n_{group}$, and the base station broadcasts the beam group ID through a broadcast message. Herein, an ID within a beam group is expressed as $n_{local}$, which corresponds to time-frequency resources that do not overlap with each other.

In an exemplary embodiment, in a case where beams are grouped, beams in the same group use the same time-frequency resource, and beams in different groups use time-frequency resources that do not overlap with each other, if the beams in the same group are numbered, the beam-related serial number is the ID within the beam group.

In an exemplary embodiment, in a case where beams are grouped, beams in the same group use the same time-frequency resource, and beams in different groups use time-frequency resources that do not overlap with each other, if the beams in the same group are not numbered, the beam-related serial number is the resource ID of the resource occupied by the beam.

If the base station groups beams, beams in a group use the same time frequency resource, and different groups use time-frequency resources that do not overlap with each other, the beam group ID is expressed as $n_{group}$, which corresponds to time-frequency resources that do not overlap with each other.

If the base station numbers the beams in a group, the beam-related serial number, may be an ID within a beam group, which is expressed as $n_{local}$, and the base station broadcasts the ID within the beam group through a broadcast message.

If the base station does not number the beams in a group, the beam-related serial number may be a resource ID of a resource (non-time-frequency resources) occupied by a beam, which is expressed as $n_{resource}$, and users obtain the resource ID according to the resource occupied by the beam.

Figure 3:
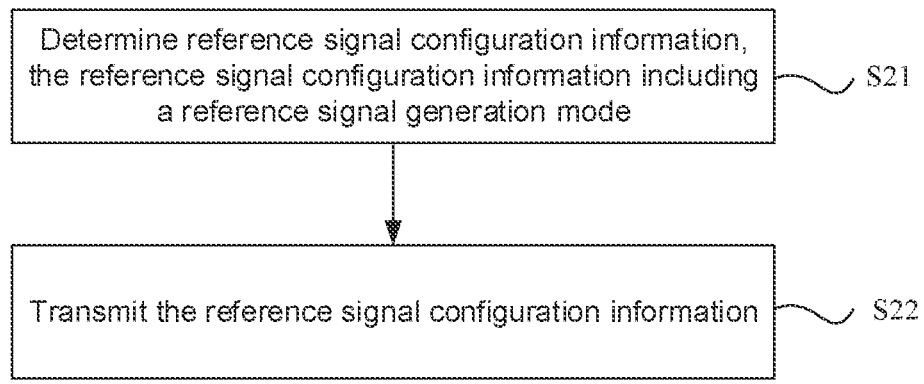
FIG. 3 is a flow chart of an information configuration method provided by embodiments of the present disclosure.

In an embodiment, as shown in FIG. 3, an information configuration method provided by the embodiments of the present disclosure mainly includes steps S21 and S22.

In S21, reference signal configuration information is determined, the reference signal configuration information including a reference signal generation mode.

In S22, the reference signal configuration information is transmitted.

The information configuration method is performed by a second node, and the second node may be any of the above base stations. The reference signal configuration information is configured and transmitted to the first node by the second node.

The reference signal generation mode refers to processing an existing reference signal, so that interference between different beams in the same physical cell may be suppressed. The reference signal configuration information is determined and transmitted by the first node.

In an exemplary embodiment, the reference signal configuration information is transmitted by one or more of:
  a broadcast message;
  a radio resource control (RRC) signaling; or
  a media access control control element (MAC CE) signaling.

In an exemplary embodiment, the reference signal generation mode is associated with a beam-related serial number.

In an exemplary embodiment, reference signals are in one-to-one correspondence to beams.

The beam may be represented by one or more of: a reference signal ID, a quasi co-location relationship, a polarization pattern, a frequency domain resource ID, a time domain resource ID, a spatial domain resource (including an antenna port, a codebook, a transmission layer, etc.) ID, a geographical area ID, a cell ID, and a tracking area ID.

In an exemplary embodiment, the description that the reference signal generation mode is associated with the beam-related serial number includes one or more of the following situations:
  a resource occupied by a reference signal in a frequency domain is associated with the beam-related serial number;
  a resource occupied by the reference signal in a time domain is associated with the beam-related serial number; or
  a sequence code of the reference signal is associated with the beam-related serial number.

In an exemplary embodiment, the resource occupied by the reference signal in the frequency domain includes one or more of:
  a resource block (RB), a carrier, a subcarrier, a resource element (RE), or a resource unit (RU).

In an exemplary embodiment, a method for associating the resource occupied in the frequency domain with the beam-related serial number includes one or more of:
  determining a position of the resource by the beam-related serial number and a frequency domain interval, or
  corresponding the number of resources to the beam-related serial number in a specific way.

In an exemplary embodiment, the resource occupied by the reference signal in the time domain includes: an OFDM symbol.

In an exemplary embodiment, a method for associating the resource occupied in the time domain with the beam-related serial number includes one or more of:
  determining a position of the resource by the beam-related serial number and a time domain interval; or
  corresponding the number of resources to the beam-related serial number in a specific way.

In an exemplary embodiment, the sequence code of the reference signal includes one or more of:
  a reference signal generation sequence, or a reference signal scrambling sequence.

In an exemplary embodiment, the beam-related serial number includes one or more of:
  a beam ID, a beam group ID, an ID within a beam group, or a resource ID of a resource occupied by a beam.

In an exemplary embodiment, in a case where beams are not grouped, the beam-related serial number is the beam ID.

In an exemplary embodiment, in a case where beams are grouped, and beams in the same group use time-frequency resources that do not overlap with each other, the beam-related serial number is the beam group ID.

In an exemplary embodiment, in a case where beams are grouped, beams in the same group use the same time-frequency resource, and beams in different groups use time-frequency resources that do not overlap with each other, if beams in the same group are numbered, the beam-related serial number is the ID within the beam group.

In an exemplary embodiment, in a case where beams are grouped, beams in the same group use the same time-frequency resource, and beams in different groups use time frequency resources that do not overlap with each other, if beams in the same group are not numbered, the beam related serial number is the resource ID of the resource occupied by the beam.

In this embodiment, as for the specific content of the reference signal generation mode and the beam-related serial number, reference may be made to the description in the foregoing embodiments, and details will not be repeated here.

In an embodiment, an interference suppression method for cell reference signals (CRS) in different beams is provided.

The CRS is a specific reference signal of a cell, and for the same beam in the NTN, the CRS is contained in almost all downlink subframes. Physical cells in the NTN are numbered and denoted as $N_{ID}^{cell}$ (in the NB-IoT, physical cells are denoted as $N_{ID}^{Ncell}$), and the beam-related serial number can be obtained in the following ways.

If the beam-related serial number is the aforementioned beam ID, the base station directly indicates the beam ID through a broadcast message.

If the beam-related serial number is the aforementioned beam group ID, the base station broadcasts the beam group ID through a broadcast message.

If the beam-related serial number is the aforementioned ID within the beam group, the base station broadcasts the ID within the beam group through a broadcast message.

If the beam-related serial number is the aforementioned resource ID of the resource occupied by the beam, such as an antenna port ID, users obtain the resource ID according to the resource occupied by the beam.

In this embodiment, beams are in one-to-one correspondence with reference signals, and a beam ID can also be a reference signal ID.

Further, the user terminal is informed of a corresponding relationship between the beam-related serial number and the combination of the interference suppression method by the base station through MAC CE or RRC. The interference suppression method includes, but is not limited to, the following methods.

1) When NB-IoT is deployed in an Inband mode, different beams may be allocated to different anchor carriers or non-anchor carriers, each carrier corresponds to a bandwidth with a size of one RB, and the frequency domain is used to separate the beams. For eMTC, different beams may be allocated to different carriers, each carrier corresponds to a narrowband with a size of 6 RBs, and the frequency domain is used to separate the beams. If the beam-related serial number is the aforementioned beam ID, then the beam ID directly corresponds to a carrier frequency. If there are 10 available (carrier frequencies $f(n_{carrier})$ expressed as $f(0)$, $f(1)$, ..., $f(9)$, where $n_{carrier}$ is a carrier frequency number, then a correspondence between the beam-related serial number and the carrier frequency is: $f(n_{carrier}):n_{carrier}=N_{ID}^{beam}$ mod 10. If the beam-related serial number is the aforementioned beam group ID, then the ID within the beam group directly corresponds to the carrier frequency, that is, the carrier frequency is: $f(n_{carrier}):n_{carrier}=n_{local}$. If the beam-related serial number is the ID within the beam group or the resource ID, the beam group ID directly corresponds to the carrier frequency, that is, the carrier frequency is: $f(n_{carrier})$: $n_{carrier}=n_{group}$.

2) Beam-level scrambling is performed on a CRS generation sequence, and the scrambling sequence is:

$$s(m)=c(m), m=0, 1, \ldots, N_{seq}.$$

Herein, c(i) is a pseudo-random sequence defined in the standard, i.e., a length—31 Gold sequence (in other words; a long Gold sequence); and $N_{seq}$ is a length of the scrambling sequence, and is equal to a length of the CRS generation sequence that is scrambled. If the beam-related serial number is the beam ID, a random seed of a pseudo-random sequence is: $c_{init}=2^{16} \cdot N_{ID}^{cell}+N_{ID}^{beam}$. If the beam-related serial number is the beam group ID, a random seed of a pseudo-random sequence is: $c_{init}=2^{16} \cdot N_{ID}^{cell}+n_{group}$. If the beam-related serial number is the ID within the beam group, a random seed of a pseudo-random sequence is: $c_{init}=2^{16} \cdot N_{ID}^{cell}+n_{local}$. If the beam-related serial number is the resource ID, a random seed of a pseudo-random sequence is: $c_{init}=2^{16} \cdot N_{ID}^{cell}+n_{resource}$. In a case where the physical cell is the same, a maximum of) $2^{16}$ different beam scrambling sequences can be supported. A sequence after beam-level scrambling can be expressed as:

$$\hat{r}(m)=s(m) \cdot r(m).$$

Herein, r(m) is a CRS generation sequence before scrambling, and s(m) is a scrambling sequence.

Figure 4:
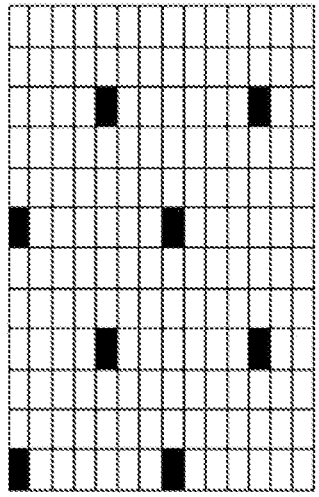
FIG. 4 is a schematic diagram showing that a cell reference signal (CRS) uses frequency division multiplexing (FDM) for resource mapping provided by embodiments of the present disclosure.
Figure 4:
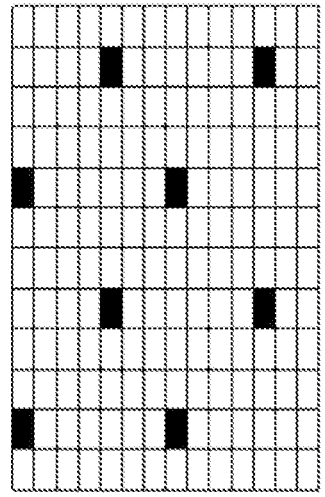
Figure 4:
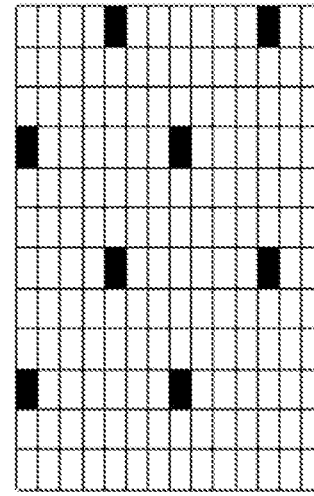

3) In an example where a single beam corresponds to a single antenna port, resource mapping positions of CRSs of different beams on a subframe resource element (RE) in a frequency division multiplexing (FDM) manner are shown in FIG. 4. Herein, $v_{shift}$ represents a displacement of a mapping position of a CRS on the frequency domain. If the beam-related serial number is the beam ID, then $v_{shift}=(N_{ID}^{cell}+N_{ID}^{beam}) \bmod 3$. If the beam-related serial number is the beam group ID, then $v_{shift}=(N_{ID}^{cell}+n_{group}) \bmod 3$. If the beam-related serial number is the ID within the beam group, then $v_{shift}=(N_{ID}^{cell}+n_{local}) \bmod 3$. If the beam-related serial number is the resource ID, then) $v_{shift}(N_{ID}^{cell}+n_{resource}) \bmod 3$.

In an embodiment, an interference suppression method for narrowband reference signals (NRSs) in different beams is provided.

The NRS is a reference signal that exists only in NB-IoT, and exists in Inband, Guardband, and standalone deployment modes. Physical cells in NTN are numbered and expressed as $N_{ID}^{Ncell}$, and the beam-related serial number can be obtained in the following ways.

If the beam-related serial number is the beam ID, the base station directly indicates the beam ID through a broadcast message.

If the beam-related serial number is the beam group ID, the base station broadcasts the beam group ID through a broadcast message.

If the beam-related serial number is the ID within the beam group, the base station broadcasts the ID within the beam group through a broadcast message.

If the beam-related serial number is the resource ID of the resource occupied by the beam, such as an antenna port ID, users obtain the resource ID according to the resource occupied by the beam.

Further, users are informed of a corresponding relationship between the beam-related serial number and the combination of the interference suppression method by the base station through MAC CE or RRC. Interference suppression of the NRS in different beams is similar to that of the CRS, and the interference suppression method includes, but is not limited to, the following methods.

1) Different beams may be allocated to different anchor carriers or non-anchor carriers, each carrier corresponds to a bandwidth with a size of one RB, and the frequency domain is used to separate the beams. If the beam-related serial number is the beam ID, the beam ID directly corresponds to the carrier frequency. If there are 10 available carrier frequencies $f(n_{carrier})$ expressed as $f(0), f(1), \ldots, f(9)$ where $n_{carrier}$ is the carrier frequency number, then the correspondence between the beam-related serial number and the carrier frequency is: $f(n_{carrier}):n_{carrier}=N_{ID}^{beam}$ mod 10. If the beam-related serial number is the beam group ID, the ID within the beam group directly corresponds to the carrier frequency, that is, the carrier frequency is: $f(n_{carrier}):n_{carrier}=n_{local}$. If the beam-related serial number is the ID within the beam group or the resource ID, the beam group ID directly corresponds to the carrier frequency, that is, the carrier frequency is: $f(n_{carrier})$: $n_{carrier}=n_{group}$.

2) Beam-level scrambling is performed on a NRS generation sequence, and the scrambling sequence is:

$$s(m)=c(m), m=0,1,\ldots,N_{seq}.$$

Herein, c(i) is a pseudo-random sequence defined in the standard, i.e., a length—31 Gold sequence (in other words, a long Gold sequence); and $N_{seq}$ is a length of the scrambling sequence, and is equal to a length of the NRS generation sequence that is scrambled. If the beam-related serial number is the beam ID, a random seed of a pseudo-random sequence is: $c_{init}=2^{16} \cdot N_{ID}^{cell}+N_{ID}^{beam}$. If the beam-related serial number is the beam group ID, a random seed of a pseudo-random sequence is: $c_{init}=2^{16} \cdot N_{ID}^{Ncell}+n_{group}$. If the beam-related serial number is the ID within the beam group, a random seed of a pseudo-random sequence is: $c_{init}=2^{16} \cdot N_{ID}^{Ncell}+n_{local}$. If the beam-related serial number is the resource ID, a random seed of a pseudo-random sequence is: $c_{init}=2^{16} \cdot N_{ID}^{Ncell}+n_{resource}$. In a case where the physical cell is the same, a maximum of $2^{16}$ different beam scrambling sequences can be supported. A sequence after beam-level scrambling can be expressed as:

$$\tilde{r}(m)=s(m) \cdot r(m)$$

Herein, r(m) is a NRS generation sequence before scrambling, and s(m) is a scrambling sequence.

Figure 5:
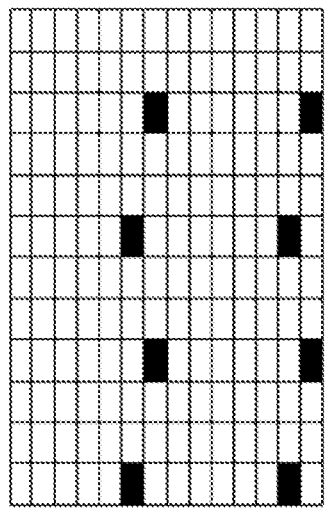
FIG. 5 is a schematic diagram showing that a narrowband reference signal (NRS) uses FDM for resource mapping provided by embodiments of the present disclosure.
Figure 5:
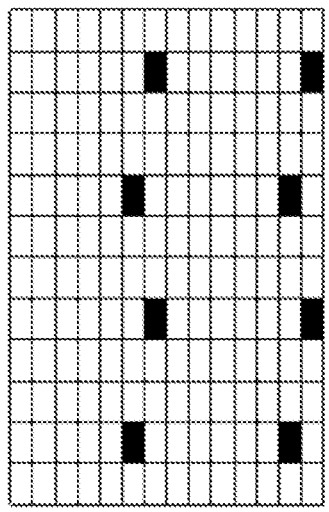
Figure 5:
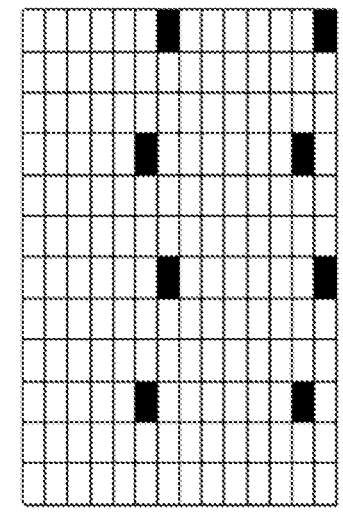

3) In an example where a single beam corresponds to a single antenna port, resource mapping positions of NRSs of different beams on a subframe RE in a FDM manner are shown in FIG. 5. Herein, $v_{shift}$ represents a displacement of a mapping position of a NRS on the frequency domain. If the beam-related serial number is the beam ID, then $v_{shift}=(N_{ID}^{Ncell})+N_{ID}^{beam})$mod 3. If the beam-related serial number is the beam group ID, then $v_{shift}=(N_{ID}^{Ncell})+N_{group})$mod 3. If the beam-related serial number is the ID within the beam group, then $v_{shift}=(N_{ID}^{Ncell})+N_{local})$mod 3. If the beam-related serial number is the resource ID, then $v_{shift}=(N_{ID}^{Ncell})+N_{resource})$mod 3.

In an embodiment, an interference suppression method of a downlink DMRS in the eMTC is provided.

Physical cells in NTN are numbered and expressed as $N_{ID}^{cell}$, and the beam-related serial number can be obtained in the following ways.

If the beam-related serial number is the beam ID, the base station directly indicates the beam ID through a broadcast message.

If the beam-related serial number is the beam group ID, the base station broadcasts the beam group ID through a broadcast message.

If the beam-related serial number is the ID within the beam group, the base station broadcasts the ID within the beam group through a broadcast message.

If the beam-related serial number is the resource ID of the resource occupied by the beam, such as an antenna port ID, users obtain the resource ID according to the resource occupied by the beam.

In addition, users are informed of a corresponding relationship between the beam-related serial number and the combination of the interference suppression method by the base station through MAC CE or RRC. As for the downlink DMRS in the eMTC, the interference suppression method includes, but is not limited to, the following methods.

1) Different beams may be allocated to different carriers, each carrier corresponds to a narrowband with a size of 6 RBs, and the frequency domain is used to separate the beams. If the beam-related serial number is the beam ID, the beam ID directly corresponds to the carrier frequency. If there are 10 available carrier frequencies $f(n_{carrier})$ expressed as $f(0), f(1), \ldots, f(9)$, where $n_{carrier}$ is the carrier frequency number, then the correspondence between the beam-related serial number and the carrier frequency is; $f(n_{carrier}):n_{carrier}=N_{ID}^{beam}$ mod 10. If the beam-related serial number is the beam group ID, the ID within the beam group directly corresponds to the carrier frequency, that is, the carrier frequency is: $f(n_{carrier}):n_{carrier}=n_{local}$. If the beam-related serial number is the ID within the beam group or the resource ID, the beam group ID directly corresponds to the carrier frequency, that is, the carrier frequency is: $f(n_{carrier})$: $n_{carrier}=n_{group}$.

2) Beam-level scrambling is performed on a DMRS generation sequence, and the scrambling sequence is:

$$s(m)=c(m), m=0, 1, \ldots, N_{seq}$$

Herein, c(i) is a pseudo-random sequence defined in the standard, i.e., a length—31 Gold sequence (in other words, a long Gold sequence); and $N_{seq}$ is a length of a scrambling sequence, and is equal to a length of the downlink DMRS generation sequence that is scrambled. If the beam-related serial number is the beam ID, a random seed of a pseudo-random sequence is: $c_{init}=2^{16} \cdot N_{ID}^{cell}+N_{ID}^{beam}$; if the beam-related serial number is the beam group ID, a random seed of a pseudo-random sequence is: $c_{init}=2^{16} \cdot N_{ID}^{cell}+n_{group}$; if the beam-related serial number is the ID within the beam group, a random seed of a pseudo-random sequence is: $c_{init}=2^{16} \cdot N_{ID}^{cell}+n_{local}$; and if the beam-related serial number is the resource ID, a random seed of a pseudo-random sequence is: $c_{init}=2^{16} \cdot N_{ID}^{cell}+n_{resource}$. In a case where the physical cell is the same, a maximum of $2^{16}$ different beam scrambling sequences can be supported. A sequence after beam-level scrambling can be expressed as:

$$\tilde{r}(m)=s(m) \cdot r(m)$$

Herein, r(m) is a downlink DMRS generation sequence before scrambling, and s(m) is a scrambling sequence.

Figure 6:
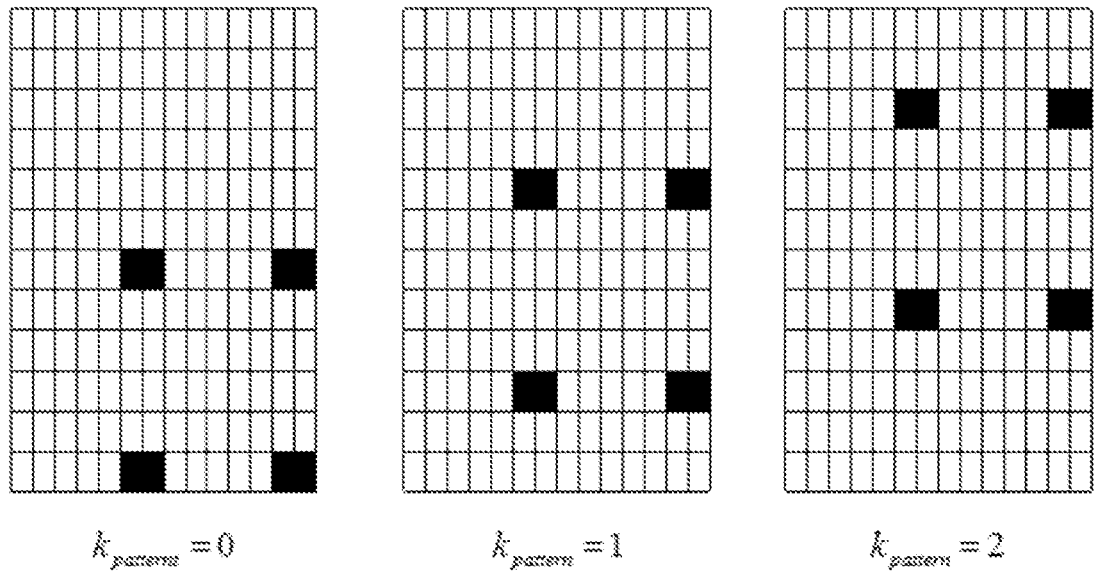
FIG. 6 is a schematic diagram showing that a downlink demodulation reference signal (DMRS) in enhanced machine type communication (eMTC) uses FDM for resource mapping provided by embodiments of the present disclosure.

3) In an example where a single beam corresponds to a single antenna port, resource mapping positions of downlink DMRS of different beams on a subframe RE in a FDM manner are shown in FIG. 6. Herein, $k_{pattern}$ represents a displacement of a mapping position of a downlink DMRS on the frequency domain. If the beam-related serial number is the beam ID, then $k_{pattern}=(N_{ID}^{cell}+N_{Id}^{beam}) \bmod 3$; if the beam-related serial number is the beam group ID, then $k_{pattern}=(N_{ID}^{cell}+n_{group}) \bmod 3$; if the beam-related serial number is the ID within the beam group, then $k_{pattern}=(N_{ID}^{cell}+n_{local}) \bmod 3$; and if the beam-related serial number is the resource ID, then $k_{pattern}=n (N_{ID}^{cell}+n_{resource}) \bmod 3$.

In an embodiment, an interference suppression method for an uplink DMRS in the eMTC is provided.

Physical cells in the NTN are numbered and expressed as $N_{ID}^{cell}$, and the beam-related serial number can be obtained in the following ways.

If the beam-related serial number is the beam ID, the base station directly indicates the beam ID through a broadcast message.

If the beam-related serial number is the beam group ID, the base station broadcasts the beam group ID through a broadcast message.

If the beam-related serial number is the ID within the beam group, the base station broadcasts the ID within the beam group through a broadcast message.

If the beam-related serial number is the resource ID of the resource occupied by the beam, such as an antenna port ID, users obtain the resource ID according to the resource occupied by the beam.

In addition, users are informed of a corresponding relationship between the beam-related serial number and the combination of the interference suppression method by the base station through MAC CE or RRC. As for the uplink DMRS in the eMTC, the interference suppression method includes, but is not limited to, the following methods.

1) Different beams may be allocated to different carriers, each carrier corresponds to a narrowband with a size of 6 RBs, and the frequency domain is used to separate the beams. If the beam-related serial number is the beam ID, the beam ID directly corresponds to the carrier frequency. If there are 10 available carrier frequencies $f(n_{carrier})$ expressed as $f(0), f(1), \ldots, f(9)$, where $n_{carrier}$ is the carrier frequency number; the correspondence between the beam-related serial number and the carrier frequency is: $f(n_{carrier}):n_{carrier}=N_{ID}^{beam} \bmod 10$. If the beam-related serial number is the beam group ID, the ID within the beam group directly corresponds to the carrier frequency, that is, the carrier frequency is: $f(n_{carrier}):n_{carrier}=n_{local}$. If the beam-related serial number is the ID in the beam group or the resource ID, the beam group ID directly corresponds to the carrier frequency, that is, the carrier frequency is: $f(n_{carrier}): n_{carrier}=n_{group}$.

2) Beam-level scrambling is performed on a DMRS generation sequence, and the scrambling sequence is:

$$s(m)=c(m), m=0, 1, \ldots, N_{seq}$$

Herein, c(i) is a pseudo-random sequence defined in the standard; i.e., a length-31 Gold sequence (in other words, a long Gold sequence); and $N_{seq}$ is a length of a scrambling sequence, and is equal to a length of the uplink DMRS generation sequence that is scrambled. If the beam-related serial number is the beam ID, a random seed of a pseudo-random sequence is: $c_{init}=2^{16} \cdot N_{ID}^{cell}+N_{ID}^{beam}$; if the beam-related serial number is the beam group ID, a random seed of a pseudo-random sequence is: $c_{init}=2^{16} \cdot N_{ID}^{cell}+n_{resource}$; if the beam-related serial number is the ID within the beam group, a random seed of a pseudo-random sequence is: $c_{init}=2^{16} \cdot N_{ID}^{cell}+n_{local}$; and if the beam-related serial number is the resource ID, a random seed of a pseudo-random sequence is: $c_{init}=2^{16} \cdot N_{ID}^{cell}+n_{resource}$. In a case where the physical cell is the same, a maximum of $2^{16}$ different beam scrambling sequences can be supported. A sequence after beam-level scrambling can be expressed as:

$$\tilde{r}(m)=s(m) \cdot r(m)$$

Herein, r(m) is a DMRS generation sequence before scrambling, and s(m) is a scrambling sequence.

Figure 7:
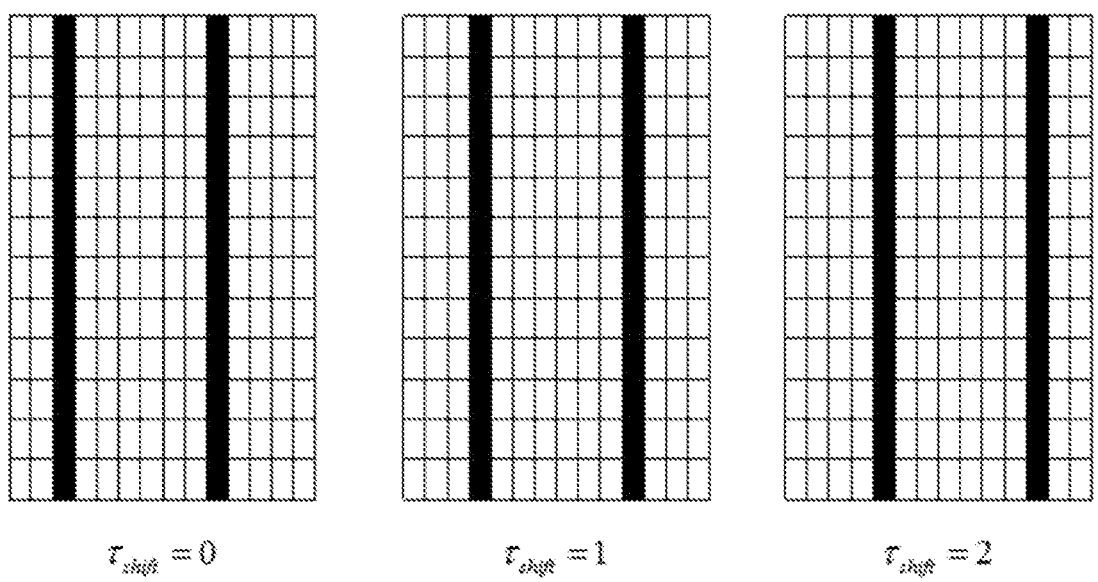
FIG. 7 is a schematic diagram showing that an uplink DMRS in eMTC uses time division multiplexing (TDM) for resource mapping provided by embodiments of the present disclosure.

3) In an example where a single beam corresponds to a single antenna port, resource mapping positions of uplink DMRSs of different beams on a subframe RE in a time division multiplexing (TDM) manner are shown in FIG. 7. Herein, $\tau_{shift}$ represents different mapping manners of the uplink DMRS in the time domain. If the beam-related serial number is the beam ID, then $\tau_{shift}=(N_{ID}^{cell}+N_{ID}^{beam}) \bmod 3$; if the beam related serial number is the beam group ID, then $\tau_{shift}=(N_{ID}^{cell}+n_{group}) \bmod 3$; if the beam-related serial number is the ID within the beam group, then $\tau_{shift}=(N_{ID}^{cell}+n_{local}) \bmod 3$; and if the beam-related serial number is the resource ID, then $\tau_{shift}=(N_{ID}^{cell}+n_{resource}) \bmod 3$.

In an embodiment, an interference suppression method for an uplink DMRS in the NB-IoT is provided.

Physical cells in the NTN are numbered and expressed as $N_{ID}^{Ncell}$, and the beam-related serial number can be obtained in the following ways.

If the beam-related serial number is the beam ID, the base station directly indicates the beam ID through a broadcast message.

If the beam-related serial number is the beam group ID, the base station broadcasts the beam group ID through a broadcast message.

If the beam-related serial number is the ID within the beam group, the base station broadcasts the ID within the beam group through a broadcast message.

If the beam-related serial number is the resource ID of the resource occupied by the beam, such as an antenna port ID, users obtain the resource ID according to the resource occupied by the beam.

In addition, users are informed of the corresponding relationship between the beam-related serial number and the combination of the interference suppression method by the base station through MAC CE or RRC. For interference suppression of the uplink DMRS in different beams, the interference suppression method includes, but is not limited to, the following methods.

1) Different beams may be allocated to different anchor carriers or non-anchor carriers, each carrier corresponds to a bandwidth with a size of one RB, and the frequency domain is used to separate the beams. If the beam-related serial number is the beam ID, the beam ID directly corresponds to the carrier frequency. If there are 10 available carrier frequencies $f(n_{carrier})$ expressed as $f(0), f(1), \ldots, f(9)$, where $n_{carrier}$ is the carrier frequency number, the correspondence between the beam-related serial number and the carrier frequency is: $f(n_{carrier}):n_{carrier}=N_{ID}^{beam} \bmod 10$. If the beam-related serial number is the beam group ID, the ID within the beam group directly corresponds to the carrier frequency, that is, the carrier frequency is:

$f(n_{carrier})$: $n_{carrier}=n_{local}$. If the beam-related serial number is the ID within the beam group or the resource ID, the beam group ID directly corresponds to the carrier frequency, that is, the carrier frequency is: $f(n_{carrier})$:

$n_{carrier}=n_{group}$.

2) Beam-level scrambling is performed on an uplink DMRS generation sequence, and the scrambling sequence is:

$$s(m)=c(m), m=0, 1, \ldots, N_{seq}.$$

Herein, c(i) is a pseudo-random sequence defined in the standard, i.e., a length—31 Gold sequence (in other words, a long Gold sequence); and $N_{seq}$ is a length of a scrambling sequence, and is equal to a length of the uplink DMRS generation sequence that is scrambled. If the beam-related serial number is the beam ID, a random seed of a pseudo-random sequence is $c_{init}=2^{16} \cdot N_{ID}^{Ncell}+N_{ID}^{beam}$; if the beam-related serial number is the beam group ID, a random seed of a pseudo-random sequence is $c_{init}=2^{16} \cdot N_{ID}^{Ncell}+n_{group}$; if the beam-related serial number is the ID within the beam group, a random seed of a pseudo-random sequence is $c_{init}=2^{16} \cdot N_{ID}^{Ncell}+n_{local}$; and if the beam-related serial number is the resource ID, a random seed of a pseudo-random sequence is $c_{init}=2^{16} \cdot N_{ID}^{Ncell}+n_{resource}$. In a case where the physical cell is the same, a maximum of $2^{16}$ different beam scrambling sequences can be supported. A sequence after beam-level scrambling can be expressed as:

$$\tilde{r}(m)=s(m)\cdot r(m)$$

Herein, r(m) is an uplink DMRS generation sequence before scrambling, and s(m) is the scrambling sequence.

3) In an example where a single beam corresponds to a single antenna port, since a basic unit of a narrow-band physical uplink share channel (NPUSCH) in the NB-IoT is resource unit (RU), the subcarrier interval, the number of subcarriers contained, and the number of time slots contained uniquely determine a RU, as shown in Table 1.

TABLE 1

RU definition table of NPUSCH

| NPUSCH format | Subcarrier interval | Number of subcarriers contained in RU | Number of time slots contained in RU | Number of OFDM symbols contained in the time slot |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

Figure 8:
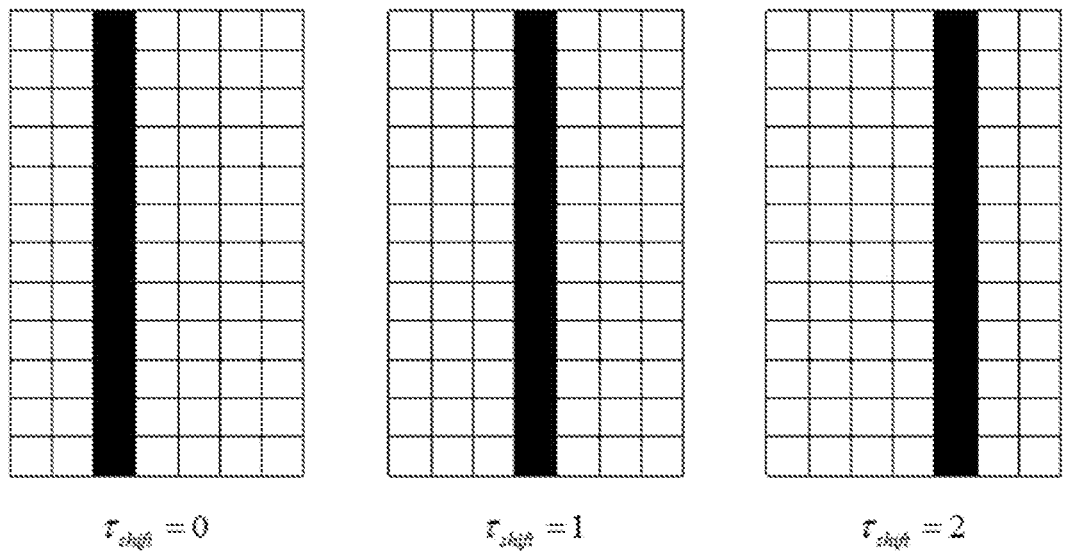
FIG. 8 is a schematic diagram showing that an uplink DMRS in narrow-band Internet of things (NB-IoT) uses TDM for resource mapping provided by embodiments of the present disclosure.

As for DMRSs of different RUs in NPUSCH format 1, the interference between different beams may be suppressed in a TDM manner during resource mapping. A DMRS mapping structure of each time slot in the RU is consistent, and a mapping structure in a time slot is as shown in FIG. 8. Herein, $\tau_{shift}$ represents different mapping manners of the uplink DMRS in the time domain. If the beam-related serial number is the beam ID, then $\tau_{shift}=(N_{ID}^{Ncell}+N_{ID}^{beam})\bmod 3$; if the beam-related serial number is the beam group ID, then $\tau_{shift}=(N_{ID}^{Ncell}+n_{group})\bmod 3$; if the beam-related serial number is the ID within the beam group, then $\tau_{shift}=(N_{ID}^{Ncell}+n_{local})\bmod 3$; and if the beam-related serial number is the resource ID, then $\tau_{shift}=(N_{ID}^{Ncell}+n_{resource})\bmod 3$.

As can be seen from Table 1, for subcarrier intervals of 3.75 kHz and 15 kHz, the RU of NPUSCH format 2 has only one format: the RU includes one subcarrier in the frequency domain and 4 time slots in the time domain. For a case that a RU contains only one subcarrier, a DMRS generation sequence is:

$$\bar{r}_u(n) = \frac{1}{\sqrt{2}}(1 + j)(1 - 2c(n))w_u(n \bmod 16),$$

$$0 \le n < M_{rep}^{NPUSCH}N_{slots}^{UL}N_{RU}.$$

Herein, $M_{rep}^{NPUSCH}$ is the number of scheduling repetitions of the $N_{slot}^{UL}$, is the number of time slots included in the RU, and $N_{RU}$ is the number of RUs scheduled for the NPUSCH. To randomize interference between different beams, a random seed of a pseudo-random sequence c(i) may be associated with the beam-related serial number. If the beam-related serial number is the beam ID, a random seed of a pseudo-random sequence is: $c_{init}=N_{ID}^{beam}$; if the beam-related serial number is the beam group ID, a random seed of a pseudo-random sequence is: $c_{init}=n_{group}$; if the beam-related serial number is the ID within the beam group, a random seed of a pseudo-random sequence is: $c_{init}=n_{local}$; and if the beam-related serial number is the resource ID, a random seed of a pseudo-random sequence is: $c_{init}=n_{resource}$.

Figure 9:
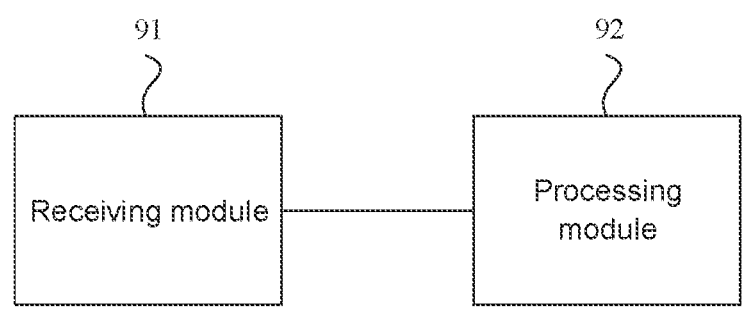
FIG. 9 is a structural diagram of a signal processing apparatus provided by embodiments of the present disclosure.

In an embodiment, as shown in FIG. 9, a signal processing apparatus provided by the embodiments of the present disclosure mainly includes a receiving module 91 and a processing module 92. The signal processing apparatus is configured at a first node.

The receiving module 91 is configured to receive reference signal configuration information, the reference signal configuration information including a reference signal generation mode.

The processing module 92 is configured to process a signal based on the reference signal configuration information.

In an exemplary embodiment, the reference signal configuration information is received by one or more of:

a broadcast message, a radio resource control (RRC) signaling, or a media access control control element (MAC CE) signaling.

In an exemplary embodiment, the reference signal generation mode is associated with a beam-related serial number.

In an exemplary embodiment, reference signals are in one-to-one correspondence to beams.

The beam may be represented by one or more of: a reference signal ID, a quasi co-location relationship, a polarization pattern, a frequency domain resource ID, a time domain resource ID, a spatial domain resource (including an antenna port, a codebook, a transmission layer, etc.) ID, a geographical area ID, a cell ID, or a tracking area ID.

In an exemplary embodiment, the description that the reference signal generation mode is associated with the beam-related serial number includes one or more of the following situations:

a resource occupied by a reference signal in a frequency domain is associated with the beam-related serial number;

a resource occupied by the reference signal in a time domain is associated with the beam-related serial number; or a sequence code of the reference signal is associated with the beam-related serial number.

In an exemplary embodiment, the resource occupied by the reference signal in the frequency domain includes one or more of:
  a resource block (RB), a carrier, a subcarrier, a resource element (RE), or a resource unit (RU).

In an exemplary embodiment, a method for associating the resource occupied in the frequency domain with the beam-related serial number includes one or more of:
  determining a position of the resource by the beam-related serial number and a frequency domain interval: or
  corresponding the number of resources to the beam-related serial number in a specific way.

In an exemplary embodiment, the resource occupied by the reference signal in the time domain includes: an OFDM symbol.

In an exemplary embodiment, a method for associating the resource occupied in the time domain with the beam-related serial number includes one or more of:
  determining a position of the resource by the beam-related serial number and a time domain interval; or
  corresponding the number of resources to the beam-related serial number in a specific way.

In an exemplary embodiment, the sequence code of the reference signal includes one or more of:
  a reference signal generation sequence, or a reference signal scrambling sequence.

In an exemplary embodiment, the beam-related serial number includes one or more of:
  a beam ID, a beam group ID, an ID within a beam group, or a resource ID of a resource occupied by a beam.

In an exemplary embodiment, in a case where beams are not grouped, the beam-related serial number is the beam ID.

In an exemplary embodiment, in a case where beams are grouped, and beams in the same group use time-frequency resources that do not overlap with each other, the beam-related serial number is the beam group ID.

In an exemplary embodiment, in a case where beams are grouped, beams in the same group use the same time-frequency resource, and beams in different groups use time-frequency resources that do not overlap with each other, if beams in the same group are numbered, the beam-related serial number is the ID within the beam group.

In an exemplary embodiment, in a case where beams are grouped, beams in the same group use the same time-frequency resource, and beams in different groups use time-frequency resources that do not overlap with each other, if beams in the same group are not numbered, the beam-related serial number is the resource ID of the resource occupied by the beam.

The signal processing apparatus provided in this embodiment may perform the signal processing method provided by any embodiment of the present disclosure, and has corresponding functional modules for performing the method. As for technical details not elaborated in this embodiment, reference may be made to the signal processing method provided in any embodiment of the present disclosure.

It is worth noting that in the above embodiment of the signal processing apparatus, various units and modules included in the signal processing apparatus are only divided according to logic functions, but they are not limited to the above division, as long as corresponding functions may be realized. In addition, the specific names of the functional units only make it easy to distinguish them from each other, and are not used to limit the scope of protection of the present disclosure.

Figure 10:
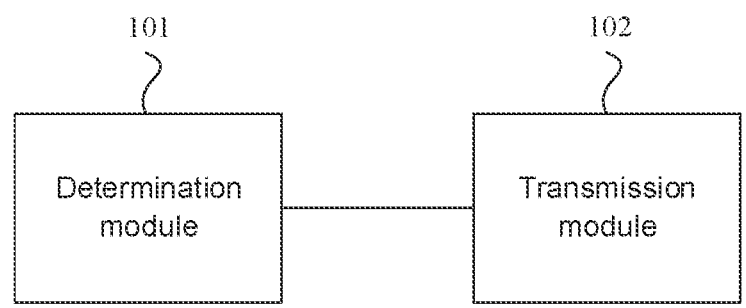
FIG. 10 is a structural diagram of an information configuration apparatus provided by embodiments of the present disclosure.

In an embodiment, as shown in FIG. 10, the information configuration apparatus provided by the embodiments of the present disclosure mainly includes a determination module 101 and a transmission module 102. The information configuration apparatus is configured at a second node.

The determination module 101 is configured to determine reference signal configuration information, the reference signal configuration information including a reference signal generation mode.

The transmission module 102 is configured to transmit the reference signal configuration information.

In an exemplary embodiment, the reference signal configuration information is transmitted by one or more of:
  a broadcast message;
  a radio resource control (RRC) signaling; or
  a media access control control element (MAC CE) signaling.

In an exemplary embodiment, the reference signal generation mode is associated with a beam-related serial number.

In an exemplary embodiment, reference signals are in one-to-one correspondence with beams.

The beam may be represented by one or more of: a reference signal ID, a quasi co-location relationship, a polarization pattern, a frequency domain resource ID, a time domain resource ID, a spatial domain resource (including an antenna port, a codebook, a transmission layer, etc.) ID, a geographical area ID, a cell ID, and a tracking area ID.

In an exemplary embodiment, the description that the reference signal generation mode is associated with the beam-related serial number includes one or more of the following situations:
  a resource occupied by a reference signal in a frequency domain is associated with the beam-related serial number;
  a resource occupied by the reference signal in a time domain is associated with the beam-related serial number; or
  a sequence code of the reference signal is associated with the beam-related serial number.

In an exemplary embodiment, the resource occupied by the reference signal in the frequency domain includes one or more of:
  a resource block (RB), a carrier, a subcarrier, a resource element (RE), or a resource unit (RU).

In an exemplary embodiment, a method for associating the resource occupied in the frequency domain with the beam-related serial number includes one or more of:
  determining a position of the resource by the beam-related serial number and a frequency domain interval; or
  corresponding the number of resources to the beam-related serial number in a specific way.

In an exemplary embodiment, the resource occupied by the reference signal in the time domain includes: an OFDM symbol.

In an exemplary embodiment, a method for associating the resource occupied in the time domain with the beam-related serial number includes one or more of:
  determining a position of the resource by the beam-related serial number and a time domain interval; or
  corresponding the number of resources to the beam-related serial number in a specific way.

In an exemplary embodiment, the sequence code of the reference signal includes one or more of:
  a reference signal generation sequence, or a reference signal scrambling sequence.

In an exemplary embodiment, the beam-related serial number includes one or more of:
    a beam ID, a beam group ID, an ID within a beam group, or a resource ID of a resource occupied by a beam.

In an exemplary embodiment, in a case where beams are not grouped, the beam-related serial number is the beam ID.

In an exemplary embodiment, in a case where beams are grouped, and beams in the same group use time-frequency resources that do not overlap with each other, the beam-related serial number is the beam group ID.

In an exemplary embodiment, in a case where beams are grouped, beams in the same group use the same time-frequency resource, and beams in different groups use time-frequency resources that do not overlap with each other, if beams in the same group are numbered, the beam-related serial number is the ID within the beam group.

In an exemplary embodiment, in a case where beams are grouped, beams in the same group use the same time-frequency resource, and beams in different groups use time frequency resources that do not overlap with each other, if beams in the same group are not numbered, the beam-related serial number is the resource ID of the resource occupied by the beam.

The information configuration apparatus provided in this embodiment may perform the information configuration method provided by any embodiment of the present disclosure, and has corresponding functional modules for performing the method. As for technical details not elaborated in this embodiment, reference may be made to the information configuration method provided by any embodiment of the present disclosure.

It is worth noting that, in the above embodiment of the information configuration apparatus, various units and modules included in the information configuration apparatus are only divided according to logic functions, but they are not limited to the above division, as long as corresponding functions may be realized. In addition, the specific names of the functional units only make it easy to distinguish them from each other, and are not used to limit the scope of protection of the present disclosure.

Figure 11:
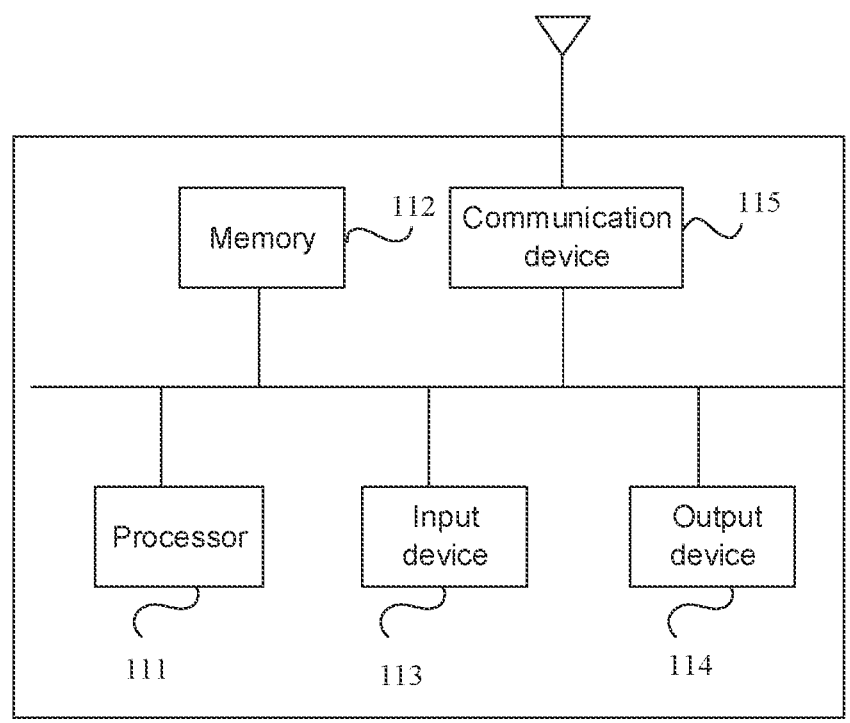
FIG. 11 is a schematic diagram showing a structure of a device provided by embodiments of the present disclosure.

The embodiments of the present disclosure further provide a device. FIG. 11 is a schematic diagram showing a structure of the device provided by the embodiments of the present disclosure. As shown in FIG. 11, the device includes a processor 111, a memory 112, an input device 113, an output device 114 and a communication device 115. The number of processors 111 included in the device may be one or more, and FIG. 11 shows an example where there is only one processor 111. The processor 111, the memory 112, the input device 113 and the output device 114 in the device can be connected by a bus or other means, and FIG. 11 shows an example where they are connected by a bus.

As a computer-readable storage medium, the memory 112 may be used for storing software programs, computer-executable programs, and modules, such as program instructions modules corresponding to the information configuration method provided in the embodiments of the present disclosure (for example, the determination module 101 and the transmission module 102 in the information configuration apparatus), and program instructions/modules corresponding to the signal processing method provided in the embodiments of the present disclosure (for example, the receiving module 91 and the processing module 92 in the signal processing apparatus). The processor 111 runs the software programs, instructions, and modules stored in the memory 112, so as to carry out various functions of the device and perform data processing, that is, implement any method provided by the embodiments of the present disclosure.

The memory 112 may mainly include a program storage area and a data storage area. The program storage area may store operating systems, and application required for at least one function. The data storage area may store data created according to the use of the device, etc. In addition, the memory 112 may include a high-speed random access memory, and may also include a non-volatile memory, for example, at least one disk memory, a flash memory, or other non-volatile solid-state memory. In some examples, the memory 112 may further include memories located remotely with respect to the processor 111, and these remote memories may be connected to the device via a network. Examples of the network include, but are not limited to, the Internet, corporate intranets; local area networks, mobile communication networks, and combinations thereof.

The input device 113 may be used for receiving input digital or character information, and generate key signal input related to user settings and function control of the device. The output device 114 may include a display device such as a display screen.

The communication device 115 may include a receiver and a transmitter. The communication device 115 is configured to send and receive information under control of the processor 111.

In an exemplary embodiment, the embodiments of the present disclosure further provide a storage medium having stored thereon computer-executable instructions. The computer-executable instructions, when executed by a computer processor, implement a signal processing method applied to a first node, which includes:
    receiving reference signal configuration information, the reference signal configuration information including a reference signal generation mode; and
    processing a signal based on the reference signal configuration information.

Of course, as for the storage medium storing computer-executable instructions provided by the embodiments of the present disclosure, the computer-executable instructions are not limited to the operations of the method described above, but may also include related operations in the signal processing method provided by any embodiment of the present disclosure.

In an exemplary embodiment, the embodiments of the present disclosure further provide a storage medium having stored thereon computer-executable instructions. The computer-executable instructions, when executed by a computer processor, implement an information configuration method applied to a second node, which includes:
    determining reference signal configuration information, the reference signal configuration information including a reference signal generation mode; and
    transmitting the reference signal configuration information.

Of course, as for the storage medium storing computer-executable instructions provided by the embodiments of the present disclosure, the computer-executable instructions are not limited to the operations of the method described above, but may also include related operations in the information configuration method provided by any embodiment of the present disclosure.

Through the above description of the implementations, those skilled in the art will clearly understand that the present disclosure may be implemented with the help of software and necessary general hardware, and of course, may also be implemented through hardware. However, in many cases, the former implementation is better. Based on this understanding, the essence of the embodiments of the present disclosure or the part that contributes to the related art may be embodied in the form of a software product. The computer software product may be stored in a computer-readable storage medium, such as a computer floppy disk, a read-only memory (ROM), a random access memory (RAM), a flash memory (FLASH), a hard disk or an optical disk, which includes a number of instructions for enabling a computer device (such as a personal computer, a server, or a network device) to perform the methods described in the embodiments of the present disclosure.

The foregoing is merely exemplary embodiments of the present disclosure, and is not intended to limit the scope of protection of the present disclosure.

Those skilled in the art will understand that the term "user terminal" covers any suitable type of wireless user equipment, such as a mobile phone, a portable data processing device, a portable web browser, or a vehicle-mounted mobile station.

Generally speaking, various embodiments of the present disclosure may be implemented in hardware or dedicated circuits, software, logic, or any combination thereof. For example, some aspects may be implemented in hardware, while other aspects may be implemented in firmware or software that can be executed by a controller, a microprocessor, or other computing devices. The present disclosure is not limited thereto.

The embodiments of the present disclosure may be implemented by using a data processor of a mobile device to execute computer program instructions, for example, in a physical processor, or through hardware, or through a combination of software and hardware. The computer program instructions may be assembly instructions, instruction set architecture (ISA) instructions, machine instructions, machine-related instructions, microcode, firmware instructions, state setting data, or source code or object code written in any combination of one or more programming languages.

The block diagram of any logic process in the drawings of the present disclosure may represent program steps, or may represent interconnected logic circuits, modules, and functions, or may represent a combination of program steps, logic circuits, modules, and functions. Computer programs may be stored on the memory. The memory may be of any type suitable for the local technical environment and may be implemented by using any suitable data storage technology, which, for example, includes but is not limited to read-only memory (ROM), random access memory (RAM), or optical memory device and system (digital multi-function disk (DVD) or compact disk (CD)). The computer-readable medium may include a non-transitory storage medium. The data processor may be of any type suitable for the local technical environment, such as a general-purpose computer, a special purpose computer, a microprocessor, a digital signal processor (DSP), an application specific integrated circuits (ASIC), a field programmable gate array (FGPA), and a processor based on a multi-core processor architecture.

What is claimed is:

1. A signal processing method applied to a first node, comprising:
   receiving reference signal configuration information, the reference signal configuration information including a reference signal generation mode, wherein the reference signal generation mode is associated with a beam-related serial number; and
   processing a signal based on the reference signal configuration information, wherein
   that the reference signal generation mode is associated with the beam-related serial number includes: a resource occupied by a reference signal in a frequency domain is associated with the beam-related serial number; and
   a method for associating the resource occupied in the frequency domain with the beam-related serial number includes at least one of:
   determining a position of the resource by the beam-related serial number and a frequency domain interval; or
   corresponding a number of resources to the beam-related serial number in a specific way.

2. The method according to claim 1, wherein the reference signal configuration information is received by at least one of:
   a broadcast message;
   a radio resource control (RRC) signaling;
   a media access control control element (MAC CE) signaling.

3. The method according to claim 1, wherein
   that the reference signal generation mode is associated with the beam-related serial number further includes at least one of following situations:
   a resource occupied by the reference signal in a time domain is associated with the beam-related serial number; or
   a sequence code of the reference signal is associated with the beam-related serial number.

4. The method according to claim 3, wherein reference signals are in one-to-one correspondence with beams.

5. The method according to claim 3, wherein
   the resource occupied by the reference signal in the frequency domain includes at least one of: a resource block (RB), a carrier, a subcarrier, a resource element (RE), or a resource unit (RU);
   the resource occupied by the reference signal in the time domain includes: an orthogonal frequency division multiplexing (OFDM) technology symbol;
   the sequence code of the reference signal includes at least one of: a reference signal generation sequence, or a reference signal scrambling sequence.

6. The method according to claim 3, wherein
   a method for associating the resource occupied in the time domain with the beam-related serial number includes at least one of:
   determining a position of the resource by the beam-related serial number and a time domain interval; or
   corresponding a number of resources to the beam-related serial number in a specific way.

7. The method according to claim 3, wherein the beam-related serial number includes at least one of:
   a beam identification (ID), a beam group ID, an ID within a beam group, or a resource ID of a resource occupied by a beam.

8. The method according to claim 7, wherein
   in a case where beams are not grouped, the beam-related serial number is the beam ID;
   in a case where beams are grouped, and beams within a same group use time-frequency resources that do not overlap with each other, the beam-related serial number is the beam group ID;
   in a case where beams are grouped, beams in a same group use same time-frequency resources, and beams in different groups use time-frequency resources that do not overlap with each other, if the beams in the same group are numbered, the beam-related serial number is the ID within the beam group;

in a case where beams are grouped, beams in a same group use same time-frequency resources, and beams in different groups use time-frequency resources that do not overlap with each other, if the beams in the same group are not numbered, the beam-related serial number is the resource ID of the resource occupied by the beam.

9. A device, comprising:

at least one processor; and a memory configured to store at least one program;

wherein the at least one program, when executed by the at least one processor, causes the at least one processor to implement the method according to claim 1.

10. A non-transitory computer-readable storage medium having stored thereon a computer program, wherein the computer program, when executed by a processor, implements the method according to claim 1.

11. An information configuration method applied to a second node, comprising:

determining reference signal configuration information, the reference signal configuration information including a reference signal generation mode, wherein the reference signal generation mode is associated with a beam-related serial number; and transmitting the reference signal configuration information, wherein that the reference signal generation mode is associated with the beam-related serial number includes: a resource occupied by a reference signal in a frequency domain is associated with the beam-related serial number; and a method for associating the resource occupied in the frequency domain with the beam-related serial number includes at least one of:

determining a position of the resource by the beam-related serial number and a frequency domain interval; or corresponding a number of resources to the beam-related serial number in a specific way.

12. The method according to claim 11, wherein the reference signal configuration information is transmitted by at least one of:

a broadcast message;

a radio resource control (RRC) signaling; or a media access control control element (MAC CE) signaling.

13. The method according to claim 11, wherein that the reference signal generation mode is associated with the beam-related serial number further includes at least one of following situations:

a resource occupied by the reference signal in a time domain is associated with the beam-related serial number; or a sequence code of the reference signal is associated with the beam-related serial number.

14. The method according to claim 13, wherein reference signals are in one-to-one correspondence with beams.

15. The method according to claim 13, wherein the resource occupied by the reference signal in the frequency domain includes at least one of: a resource block (RB), a carrier, a subcarrier, a resource element (RE), or a resource unit (RU);

the resource occupied by the reference signal in the time domain includes: an orthogonal frequency division multiplexing (OFDM) technology symbol;

the sequence code of the reference signal includes at least one of: a reference signal generation sequence, or a reference signal scrambling sequence.

16. The method according to claim 13, wherein a method for associating the resource occupied in the time domain with the beam-related serial number includes at least one of:

determining a position of the resource by the beam-related serial number and a time domain interval; or corresponding a number of resources to the beam-related serial number in a specific way.

17. The method according to claim 13, wherein the beam-related serial number includes at least one of:

a beam identification (ID), a beam group ID, an ID within a beam group, or a resource ID of a resource occupied by a beam.

18. The method according to claim 17, wherein in a case where beams are not grouped, the beam-related serial number is the beam ID;

in a case where beams are grouped, and beams within a same group use time-frequency resources that do not overlap with each other, the beam-related serial number is the beam group ID;

in a case where beams are grouped, beams in a same group use same time-frequency resources, and beams in different groups use time-frequency resources that do not overlap with each other, if the beams in the same group are numbered, the beam-related serial number is the ID within the beam group;

in a case where beams are grouped, beams in a same group use same time-frequency resources, and beams in different groups use time-frequency resources that do not overlap with each other, if the beams in the same group are not numbered, the beam-related serial number is the resource ID of the resource occupied by the beam.

19. A device, comprising:

at least one processor; and a memory configured to store at least one program;

wherein the at least one program, when executed by the at least one processor, causes the at least one processor to implement the method according to claim 11.

20. A non-transitory computer-readable storage medium having stored thereon a computer program, wherein the computer program, when executed by a processor, implements the method according to claim 11.

* * * * *